United States Patent
Degrauwe et al.

(10) Patent No.: US 6,685,096 B1
(45) Date of Patent: Feb. 3, 2004

(54) TRANSPONDER INTENDED FOR SEVERAL DIFFERENT APPLICATIONS

(75) Inventors: Marc Degrauwe, Chez-le-Bart (CH); Gilles Cérède, Neuchâtel (CH); Thierry Roz, Prêles (CH)

(73) Assignee: EM Microelectronic-Marin SA, Marin (CH)

( * ) Notice: Subject to any disclaimer, the term of this patent is extended or adjusted under 35 U.S.C. 154(b) by 103 days.

(21) Appl. No.: 09/664,765

(22) Filed: Sep. 19, 2000

(30) Foreign Application Priority Data

Sep. 22, 1999 (EP) .............................. 99118661

(51) Int. Cl.[7] .............................................. G06K 19/06
(52) U.S. Cl. ...................... 235/492; 235/375; 235/384; 340/10.2; 340/10.34
(58) Field of Search ................................ 235/492, 375, 235/384; 340/10.2, 10.34, 825.54

(56) References Cited

U.S. PATENT DOCUMENTS

| | | | |
|---|---|---|---|
| 4,857,893 A | * 8/1989 | Carroll | ................. 340/10.34 |
| 5,252,962 A | * 10/1993 | Urbas et al. | ................. 128/903 |
| 5,294,931 A | * 3/1994 | Meier | ................. 342/44 |
| 5,347,263 A | * 9/1994 | Carroll et al. | ................. 235/382 |
| 5,425,032 A | * 6/1995 | Shloss et al. | ................. 340/10.2 |
| 5,799,156 A | * 8/1998 | Hogan et al. | ................. 709/237 |
| 5,822,683 A | * 10/1998 | Paschen | ................. 340/10.34 |
| 5,926,110 A | 7/1999 | Downs et al. | ................. 340/825.54 |
| 6,070,803 A | * 6/2000 | Stobbe | ................. 235/384 |

FOREIGN PATENT DOCUMENTS

| EP | 0 453 314 | 10/1991 |
|---|---|---|
| EP | 0 670 556 | 9/1995 |
| EP | 0 706 151 | 4/1996 |

* cited by examiner

*Primary Examiner*—Michael G. Lee
*Assistant Examiner*—Steven S. Paik
(74) *Attorney, Agent, or Firm*—Griffin & Szipl

(57) ABSTRACT

Transponder (2) associated with a communication system for various different applications having different security levels. This transponder includes means (18, 26, 40, R) allowing the maximum communication distance between the transponder and a reader (4) to be varied as a function of the application selected or activated. A code, which determines the opening or closing of the switch (40) is associated with each application. In a first group of embodiments, the equivalent impedance of the electronic unit associated with the antenna (6) is varied, whereas in another embodiment, the electric characteristics of the antenna itself are varied.

11 Claims, 5 Drawing Sheets

__US 6,685,096 B1__

TRANSPONDER INTENDED FOR SEVERAL DIFFERENT APPLICATIONS

FIELD OF THE INVENTION

The present invention concerns transponders associated with identification systems or transactions of various natures. More particularly, the present invention concerns a transponder intended for several different applications.

BACKGROUND OF THE INVENTION

Currently, a transponder is generally intended for a single specific application, in particular for bank transactions, for the payment of certain services or goods, or for recognizing or identifying objects or individuals. The transponder may take different forms, in particular the form of a card. Thus, there are bank cards, telephone cards and access cards for certain buildings or means of transport.

The multiplication of different applications generates a multiplication of the cards or transponders with which the user is burdened. Indeed, these cards or transponders generally have to be carried by the user as he moves around. This is the reason why, within the scope of the present invention, a transponder or card intended for several different applications is proposed. Hereinafter, only the term transponder will be used, defined as a contactless communication device with a reader or transmitter, in particular a card.

However, a multi-application transponder is confronted with a problem of different security levels for the different applications. Indeed, certain applications, in particular those linked to monetary transactions, require a high level of security.

Conversely other applications do not require such a security level. An important parameter involved in the notion of security for a transponder system is the maximum communication distance between a transponder and a reader of the system. Thus, certain applications are implanted in systems allowing only short, or very short distance communication, so as to prevent, in particular, a receiver outside the system being able to receive the electromagnetic signals exchanged between the reader and the transponder. Conversely, other applications, in particular in the field of identifying people or objects, are implanted in systems allowing at least medium distance communication, i.e. greater then ten or so centimeters.

Given that the transponders known to those skilled in the art, in particular passive type transponders, are arranged with an antenna associated with an electronic unit allowing communication at a pre-defined maximum distance for a determined power of the activation signal transmitted by the reader, those skilled in the art cannot easily provide a passive transponder for various applications requiring different maximum communication distances.

The object of the present invention is to overcome this major drawback.

SUMMARY OF THE INVENTION

The present invention therefore concerns a transponder including a communication antenna and an electronic unit arranged so as to control several different applications, characterized in that it includes means for varying the maximum communication distance with a reader as a function of the application selected or activated among said different applications.

In a preferred embodiment, the means for varying the maximum communication distance include means for varying the equivalent impedance of the transponder's electronic unit.

In a variant of this embodiment, the means for varying this equivalent impedance include means for varying the equivalent resistance of the electronic unit so as to vary the current consumed by the latter and thus the load.

BRIEF DESCRIPTION OF THE DRAWINGS

The present invention will be better understood with the aid of the following description, made with reference to the annexed drawings, given by way of non-limiting example, in which.

DETAILED DESCRIPTION OF THE PREFERRED EMBODIMENTS

Figure 1:
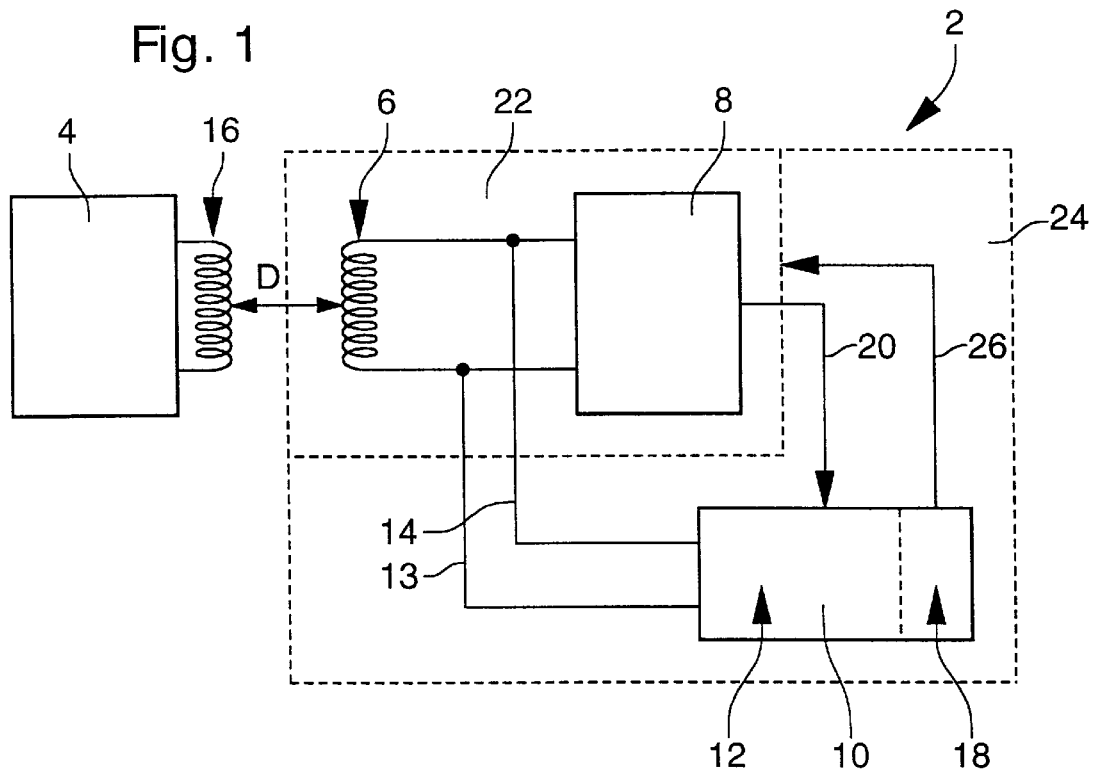
FIG. 1 shows schematically a communication system including a reader and a transponder according to the invention.

With reference to FIG. 1, the general concept of the present invention will be described in the case of a multi-application transponder powered in passive mode. Passive transponder 2 is intended for several different applications and can thus be associated with various readers or transmitters and in particular with reader 4 shown in this Figure. Transponder 2 includes an antenna 6 electrically connected to a power supply circuit 8 which powers electronic circuit 10. This circuit 10 includes a conventional portion 12 which assures, in particular, communication with reader 4, by means of an analogue processing portion for the signals received by antenna 6 via electric connections 13 and 14, and a portion belonging to the present invention forming a logic circuit 18 for controlling the maximum communication distance between antenna 6 of transponder 2 and antenna 16 of reader 4. It will be noted here that reader 4 can have several antennas and in particular two different antennas for transmitting and receiving electromagnetic signals.

Electronic circuit 10 which also includes the logic data processing circuit requires a certain minimum voltage and a certain minimum supply current in order to operate properly. The voltage and supply current are provided to circuit 10 by power supply circuit 8, schematised by electric connection 20. In order to clarify the terminology used in particular in the annexed claims, it should be noted that the set of electronic circuits, in FIG. 1, circuits 8 and 10, form the electronic unit of transponder 2 associated with antenna 6 of the transponder. Functionally, two portions of transponder 2 can be defined, namely portion 22 including antenna 6 and power supply circuit 8 and portion 24 formed of the other electronic circuits of the transponder for controlling the communication and processing of data, each envisaged application of transponder 2 being implanted in this portion 24.

All the embodiments described hereinafter have in common the fact that logic circuit 18 acts on portion 22 so as to vary at least one electric characteristic of this portion as a function of the application selected or activated from among the plurality of applications provided. By defining power supply circuit 8 as the set of electronic circuits arranged between antenna 6 and circuit 10, the action exerted by logic circuit 18 on portion 22, schematised by electric connection 26, amounts either to varying the equivalent impedance of circuit 8 as a function of the application selected or activated, or varying the actual characteristics of antenna 6.

Figure 2:
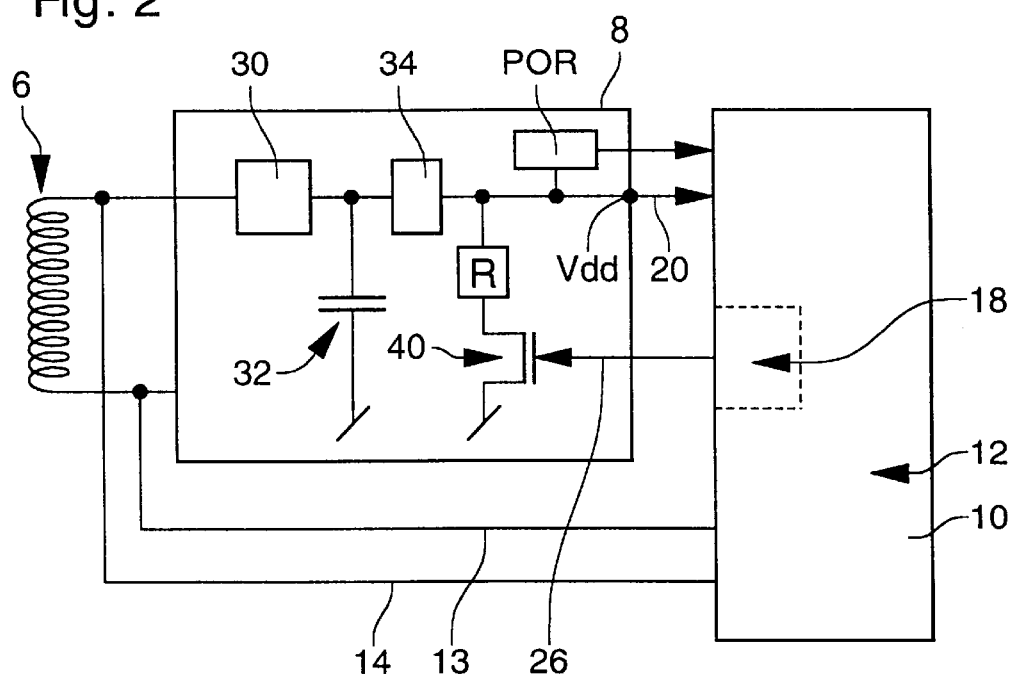
FIG. 2 shows schematically a first embodiment of the invention.

FIG. 2 shows a first embodiment of a passive transponder according to the invention, the elements described hereinbefore will not be described again in detail. A rectifier-filter 30, an electric power storage capacity 32, a voltage regulator 34 and a power on reset unit (POR) for electronic circuit 10 are arranged in power supply circuit 8 in a conventional manner. The POR keeps circuit 10 out of operation while the supply voltage supplied by circuit 8 is less than a pre-defined voltage threshold assuring normal operation of circuit 10.

According to the invention, a resistor R is also provided in circuit 8, arranged in series with a switch 40, formed in particular by a transistor, the opening and closing of which is controlled by logic circuit 18 for controlling the maximum communication distance. Resistor R and transistor 40 are arranged between two terminals of circuit 8 having different electric potentials, namely between positive terminal Vdd of the supply voltage applied to circuit 10 and earth. According to whether switch 40 is open or closed, the equivalent resistance of the electronic unit, in the present case of power supply circuit 8, varies. The control of the communication distance as a function of the opening and closing of switch 40 by circuit 18 is explained hereinafter with reference to FIGS. 3a and 3b.

Figure 3A:
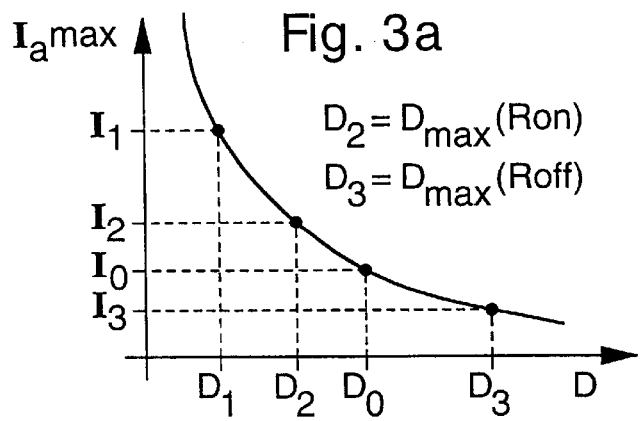
FIG. 3a is a graph representing the behavior of the maximum current in the antenna of a passive transponder as a function of the distance separating it from a reader supplying an electromagnetic activation signal.
Figure 3B:
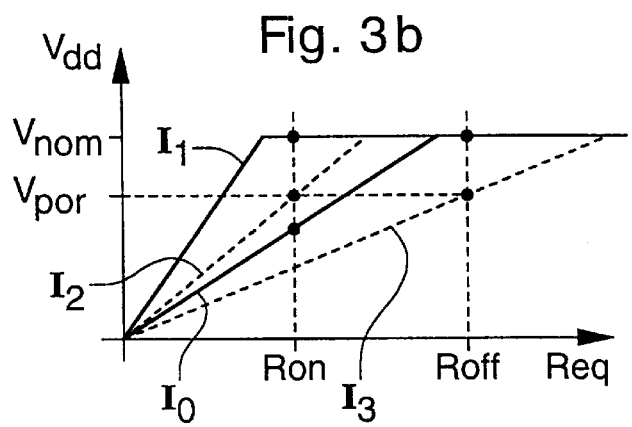
FIG. 3b is a graph representing the characteristic curve of the voltage supplied by the power supply circuit of the transponder as a function of the load thereof.

FIG. 3a shows the maximum supply current $I_a^{max}$ relative to distance D (see FIG. 1) between antenna 6 of the transponder and a reader. With an increase in distance D, current $I_a^{max}$ decreases. Maximum currents $I_0$, $I_1$, $I_2$ and $I_3$ correspond to the four distances $D_0$, $D_1$, $D_2$ and $D_3$. Power supply circuit 8 may be considered as a voltage source supplying a nominal voltage Vnom. FIG. 3b shows on a graph the high voltage Vdd supplied by power supply circuit 8 as a function of the equivalent resistance Req of the electronic unit of the transponder formed by circuits 8 and 10. The POR device has a voltage threshold Vpor for operating circuit 10, i.e. circuit 10 is powered only above the value of supply voltage Vdd greater than Vpor. Depending on the behavior of a voltage source, the voltage supplied increases in a substantially linear manner in a first range where the equivalent resistance Req is low until it reaches nominal value Vnom. The slope of the linear segment in FIG. 3b depends on the maximum current supplied by antenna $I_a^{max}$. Thus, as is clear from FIG. 3b, for an equivalent resistance Roff, with switch 40 closed, the maximum communication distance is $D_3$ corresponding to a relatively long distance. At resistance Roff, voltage Vdd is at Vnom for distances $D_0$, $D_1$ and $D_2$. Conversely when switch 40 is open equivalent resistance Req decreases to value Ron. At that value, it can be seen that voltage Vpor is reached for currents higher that of equal to $I_2$ corresponding to communication distances less than $D_2$ (see FIG. 3a). Maximum communication distance $D_2$ is relatively small, i.e. considerably less than $D_3$. At smallest distance D, supply voltage Vdd is equal to Vnom, whereas at the intermediate distance $D_0$ to distance $D_2$ and $D_3$, the supply voltage Vdd is less than Vpor. It will thus be understood that the arrangement according to the invention of this first embodiment allows the maximum communication distance to be efficiently controlled as a function of the application selected or activated. This control will be described more precisely hereinafter.

Figure 4:
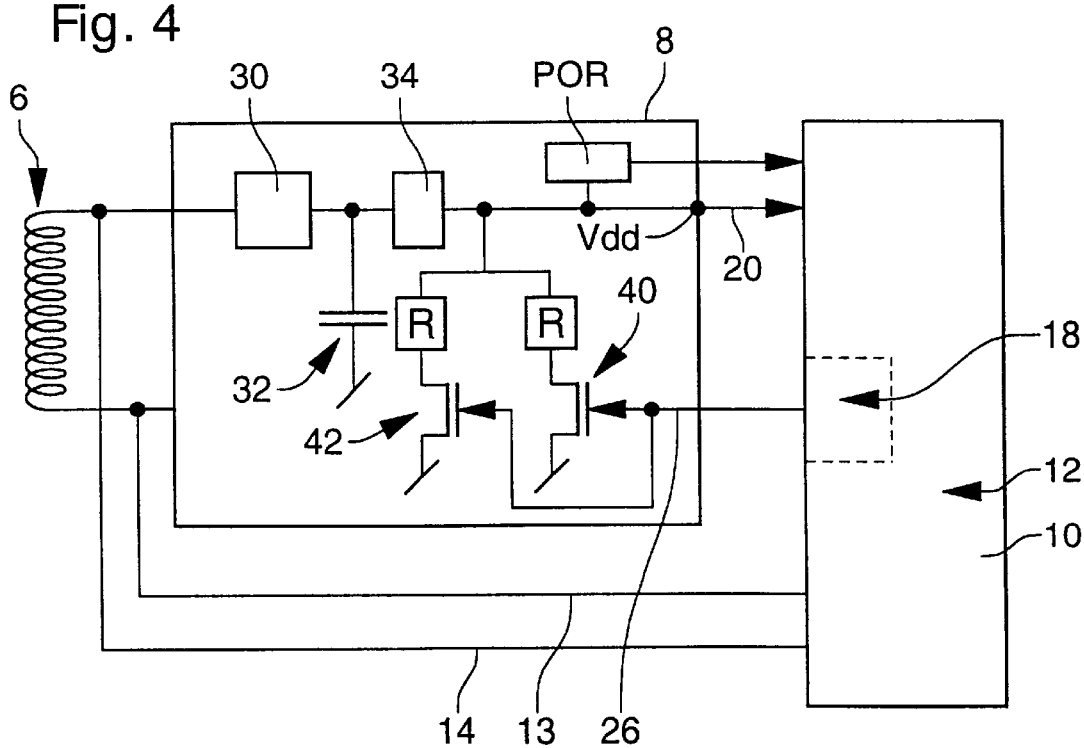
FIG. 4 shows schematically a variant of the first embodiment.

FIG. 4 shows a variant of the embodiment of FIG. 2. This variant is distinguished in that it provides a parallel arrangement of two resistors R respectively connected in series to two transistors 40 and 42 between earth and a high voltage terminal. The two switches 40 and 42 are controlled by maximum distance control circuit 18. This variant thus allows three different maximum distances to be defined for different applications. Indeed, equivalent resistance Req takes three different values depending on whether switches 40 are ON-ON, ON-OFF or OFF-OFF. Other equivalent variants may of course be provided by those skilled in the art.

Figure 5:
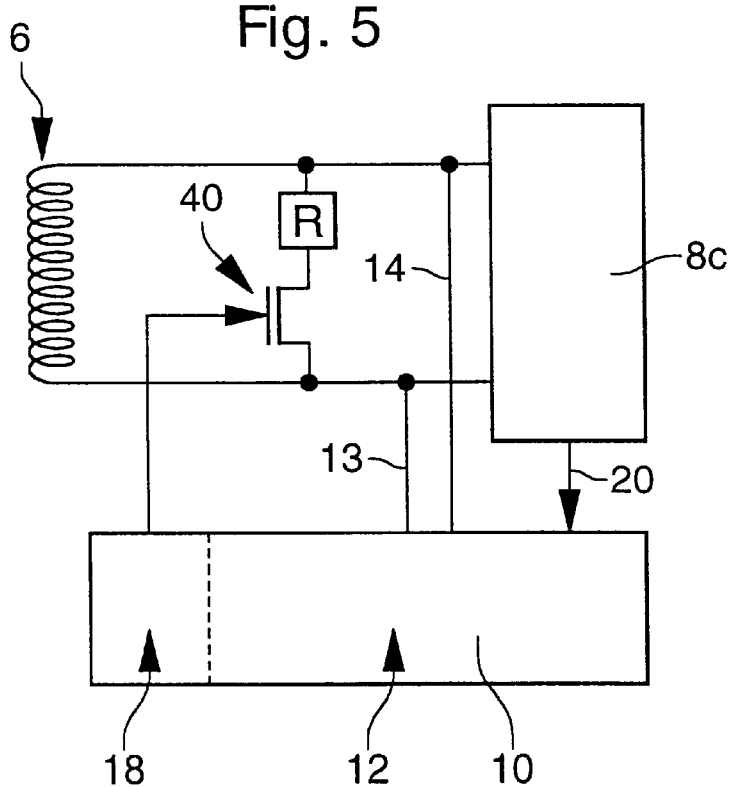
FIGS. 5 and 6 show schematically and respectively second and third embodiments of the invention.

FIG. 5 shows a second embodiment of a passive transponder according to the invention. The references already cited previously will not be described again here in detail. This embodiment differs from the first in that resistor R and switch 40 are connected in series between the two terminals of antenna 6 and the two input terminals of a conventional power supply circuit 8c. This also amounts to varying the equivalent impedance of the electronic unit of the transponder by varying its equivalent resistance. Again, the value of resistor R is selected so that if switch 40 is open, there is a decrease in the voltage across the terminals of antenna 6 with which is associated, as in the first embodiment, a leakage current. Thus, in a similar manner to the first embodiment, the maximum communication distance varies according to whether switch 40 is open or closed, this distance being smaller when the switch is open.

Figure 6:
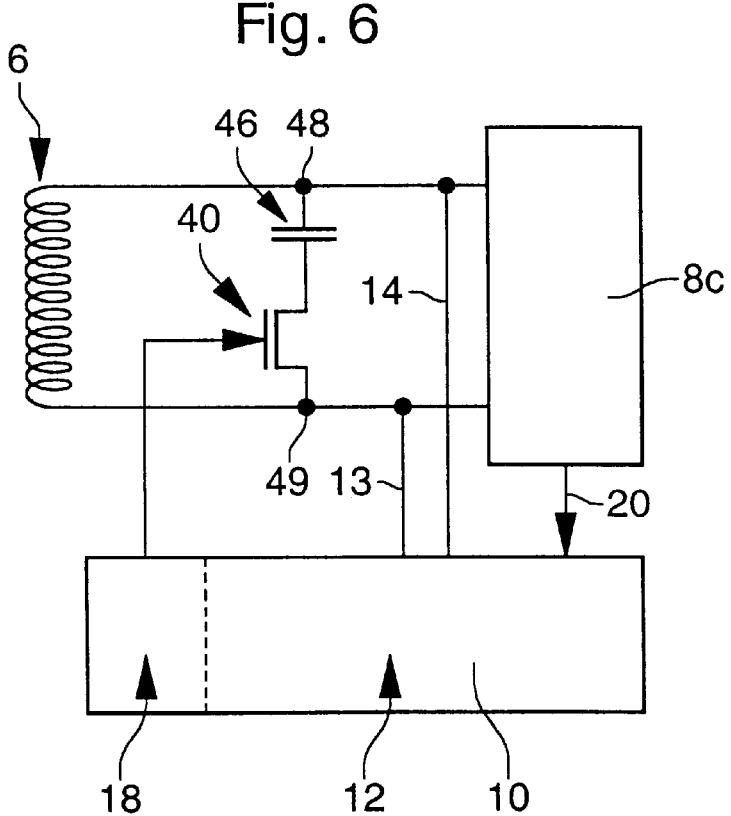
Figure 7:
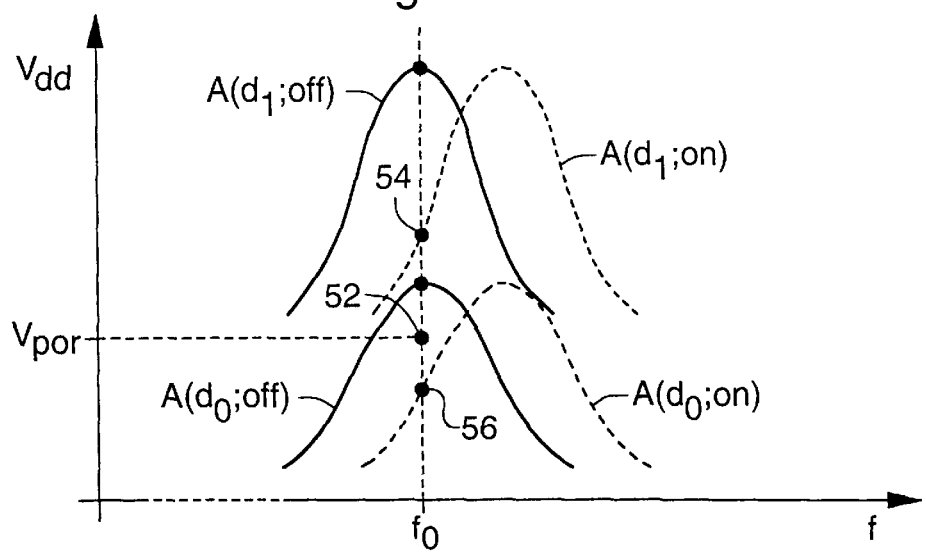
FIG. 7 shows schematically the voltage across the terminals of an antenna of a passive transponder as a function of the frequency of the electromagnetic activation signal for two different distances and two different states of the device of FIG. 6.

With reference to FIGS. 6 and 7, a third embodiment of a passive transponder according to the invention will be described hereinafter. In addition to conventional power supply circuit 8c and conventional portion 12 of circuit 10, the invention provides the arrangement of a tuning capacitance 46 of antenna 6 connected in series to switch 40 between the two terminals 48 and 49 of the antenna. As in the first embodiment, switch 40 is controlled by portion 18 of circuit 10 which forms a logic circuit for controlling the maximum communication distance.

FIG. 7 shows various resonance curves giving the amplitude of supply voltage Vdd as a function of frequency F of the electromagnetic activation signal of the transponder supplied by a reader. The two curves in full lines correspond to amplitude A of the supply voltage when switch 40 is closed, for two different distances $D_0$ and $D_1$. These two curves are substantially centred on frequency F0 of the activation signal received by the transponder. The variation in the communication distance generates a variation in amplitude A, this amplitude decreasing with the distance ($D_0 > D_1$). When switch 40 is open, i.e. in an "ON" state, the equivalent reactance of the electronic unit associated with antenna 6 is varied, in the present case the equivalent capacitance. This has the effect of moving the frequency of the resonance curve, as is shown in FIG. 7 by the curves in dotted lines for communication distances $D^0$ and $D_1$.

Power supply circuit 8c includes, in a conventional manner, a POR unit described hereinbefore. This POR unit allows electronic circuit 10 to operate only above a predefined voltage threshold Vpor. When switch 40 is in an "OFF" state, i.e. closed, communication can be established for two distances $D_0$ and $D_1$, the maximum communication distance being greater than $D_0$. Indeed, communication can be established as long as the peak of the resonance curve is above point 52, i.e. above Vpor. Conversely, when switch 40 is in an "ON" state, i.e. open, the reactance of the transponder antenna system varies generating a frequency movement, as mentioned hereinbefore. In this case, for an activation frequency $F_0$, the amplitude of the supply voltage corresponds to point 54 which is higher than point 52 for distance D1 whereas for distance $D_0$, this amplitude corresponds to point 56 which is lower than point 52 and thus lower than threshold voltage Vpor. Thus, it is clear that the communication distance decreases when switch 40 is open. This switch is thus opened and closed as a function of the application selected or activated, in relation to the required level of security.

Figure 8:
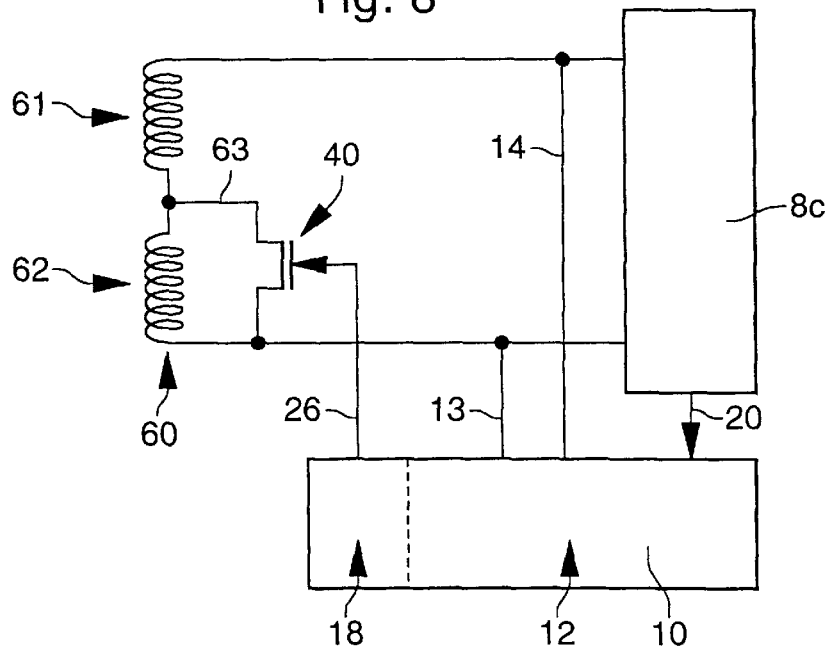
FIG. 8 shows schematically a fourth embodiment of the invention.

FIG. 8 shows a fourth embodiment which differs from the two preceding embodiments in that the action for varying the communication distance corresponds to a variation in the actual characteristics of antenna 60. Means are provided for varying the impedance of antenna 60. In the variant shown in FIG. 8, antenna 60 has two portions 61 and 62 where the junction of these two portions defines an intermediate point connected to the other terminal of portion 62 by an electric connection 64 on which is arranged a switch 40. This switch is controlled, as in the preceding embodiments, by maximum communication distance control circuit 18. When switch 40 is open, portion 62 of antenna 60 is short-circuited. Consequently, the voltage and current supplied by the antenna decrease. For the same reasons as given hereinbefore, there results a variation in the supply voltage supplied by circuit 8c, which varies the maximum communication distance for which the supply voltage reaches amplitude Vpor.

Other alternative embodiments of passive transponders may be envisaged by those skilled in the art without departing from the scope of the present invention, i.e. either by acting on the equivalent impedance of the electronic unit, or by acting on the electric characteristics of the antenna, in particular by varying the length thereof and particularly the number of turns.

Figure 9:
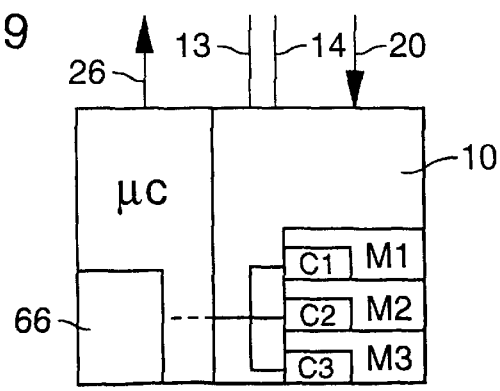
FIG. 9 shows schematically and partially a preferred arrangement of the electronic unit of the transponder according to the invention.

With reference to FIG. 9, a partial arrangement of electronic circuit 10 will be described. This circuit includes a memory portion whose various zones M1, M2 and M3 are intended for as many different applications. In each of these memory zones a code C1, C2 and respectively C3 is inscribed which defines a security code for the application concerned and in particular a maximum distance communication with a certain type of reader or transmitter. Of course, these maximum distances vary as a function of the transmission power of the electromagnetic activation signal. When an application is selected or activated, a microcontroller (or control circuit) reads the code in the corresponding memory zone and introduces it into a random-access memory 66. This code determines the control signal applied to the maximum communication distance varying means, in particular to switch 40 via electric connection 26. As was already mentioned, only two different maximum distances can be provided or more than two different maximum distances can be provided by arranging a plurality of switches associated with the elements varying either the equivalent impedance of the electric unit, or the electric characteristics of the antenna.

In another envisaged system, the security code is supplied to the transponder by the reader or transmitter when each application associated with the reader or transmitter is activated.

Whereas the first embodiment described above applies only to passive transponders, the second, third and fourth embodiments may also equally apply to active transponders. Indeed, these embodiments propose acting on the electric parameters of the antenna device by varying either the antenna gain, or the tuning of the antenna or by varying the dimensions of the antenna, in particular the number of active turns. Thus, in these three embodiments, the sensitivity of the antenna to the reception of an electromagnetic signal or a determined frequency or a given frequency distribution is varied.

Figure 10:
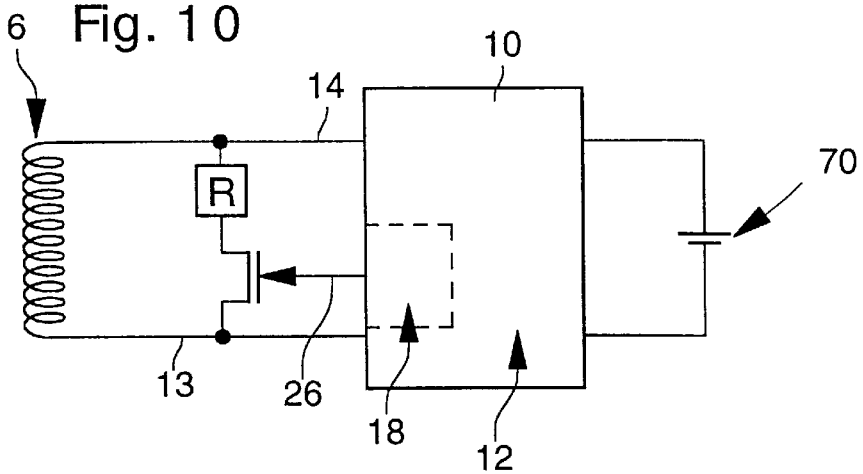
FIG. 10 shows an active transponder, powered by a power source, corresponding to the second embodiment of the present invention.
Figure 11:
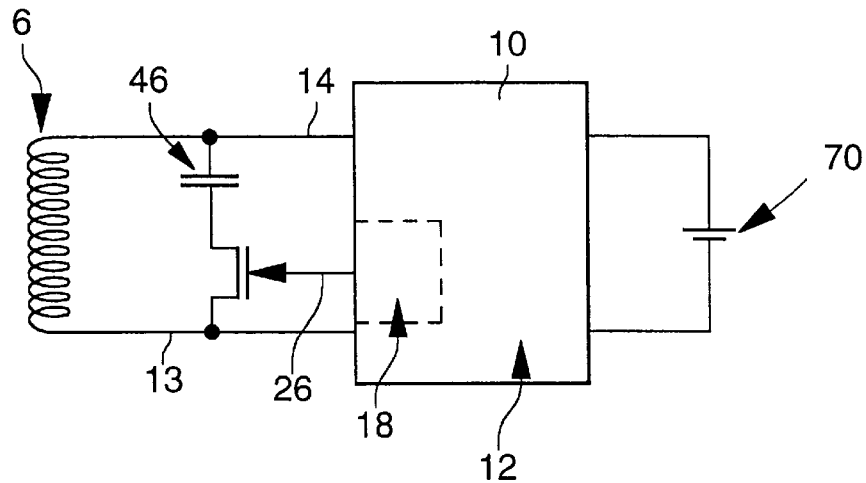
FIG. 11 shows an active transponder, powered by a power source, corresponding to the third embodiment of the present invention.
Figure 12:
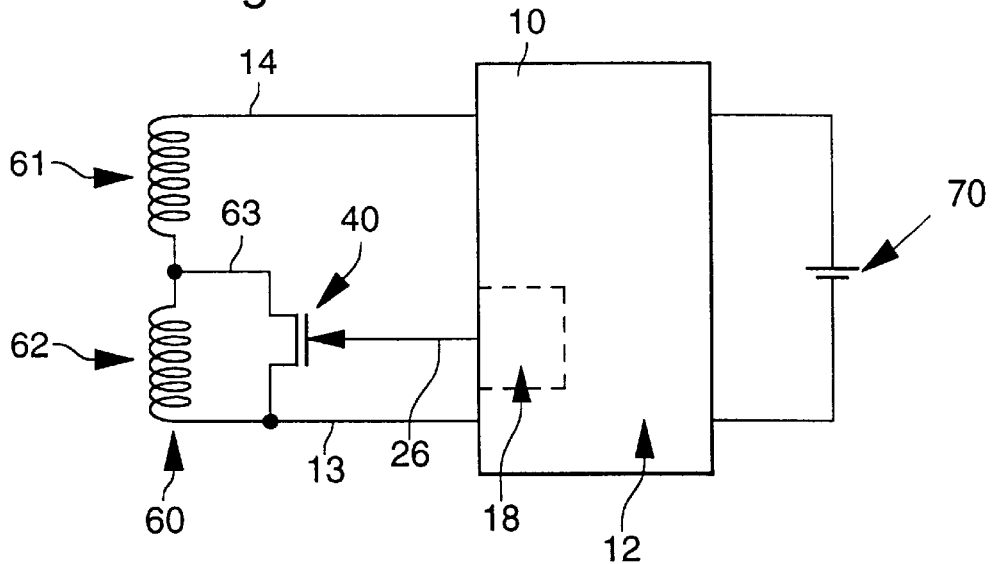
FIG. 12 shows an active transponder, powered by a power source, corresponding to the fourth embodiment of the present invention.

FIGS. 10 to 12 show three active transponders, powered by a power source 70, corresponding to the second, third and fourth embodiments previously described. It is to be noted therefore that power supply 8c provided in the case of passive transponders is simply replaced by a power source 70, in particular a battery, in the active transponder embodiments.

The active transponders, shown in FIGS. 10 to 12, allow the electromagnetic signal reception distance to be varied as a function of the application selected or activated in the same way as described above. Consequently, the elements already described and the operation of the active transponders of FIGS. 10 to 12 will not be described here in detail.

Finally, it will be noted that in another embodiment inspired by the fourth embodiment shown in FIGS. 8 and 12, it is possible to provide two distinct antennas having different sensitivities to the electromagnetic signals received, the logic circuit for controlling the maximum communication distance being associated with selection means allowing one or other of the two antennas to be selected as a function of the application selected or activated. This solution increases, however, the cost and space requirement of the transponder.

What is claimed is:

1. A multi-application transponder including an antenna and an electronic unit arranged so as to control several different applications, wherein the electronic unit receives in memory zones several distance codes associated respectively with the several applications, concurrently implemented in said transponder and wherein said transponder includes means for varying the maximum communication distance with a reader as a function of the application selected or activated from among the different applications, and the means for varying the maximum communication distance is arranged to read the distance code associated with the application selected or activated and to control the maximum communication distance as a function of the distance code associated with the application selected or activated.

2. The transponder according to claim 1, wherein said means for varying the maximum communication distance include means for varying the equivalent impedance of said electronic unit.

3. The transponder according to claim 2, wherein said means for varying said equivalent impedance include means for varying the equivalent resistance of said electronic unit.

4. The transponder according to claim 3, powered in passive mode by a power supply circuit connected to said antenna and wherein is arranged a rectifier, wherein said means for varying said equivalent resistance are formed by at least one resistor arranged in series with a switch between two terminals of said power supply circuit located after said rectifier in relation to said antenna, these two terminals having different electric potentials and by a logic circuit for controlling the maximum communication distance which controls said switch as a function of the application selected or activated.

5. The transponder according to claim 3, wherein said means for varying said equivalent resistance are formed by at least one resistor arranged in series with a switch between the two terminals of the antenna and by a logic circuit for controlling the maximum communication distance which controls said switch as a function of the application selected or activated.

6. The transponder according to claim 2, wherein said means for varying said equivalent impedance include means for varying the equivalent reactance of said electronic unit.

7. The transponder according to claim 6, wherein said means for varying said equivalent reactance are formed by at least one tuning capacitance of said antenna, this capacitance being arranged in series with a switch between the two terminals of the antenna and by a logic circuit for controlling the maximum communication distance which controls said switch as a function of the application selected or activated.

8. The transponder according to claim 1, wherein said means for varying the maximum communication distance include means for varying the electric characteristics of said antenna.

9. The transponder according to claim 8, wherein said means for varying the electric characteristics of said antenna include a switch whose two terminals are respectively connected to a terminal of said antenna and to an intermediate point of this antenna so as to vary antenna length, in particular the number of turns, and a logic circuit for controlling the maximum communication distance which controls said switch as a function of the application selected or activated.

10. A multi-application transponder controlling a plurality of different applications, the transponder comprising:

an antenna;

an electronic unit electrically connected to the antenna, wherein the electronic unit is arranged so as to control the plurality of different applications and to receive in memory zones several distance codes associated respectively with the plurality of different applications stored in the memory zones concurrently; and means for varying the maximum communication distance with a reader as a function of the application selected or activated from among the plurality of different applications, wherein the means for varying the maximum communication distance is arranged to read the distance code associated with the application selected or activated and to control the maximum communication distance as a function of the distance code.

11. A multi-application transponder including:

an electronic unit arranged so as to control several different applications;

an antenna connected to the electronic unit;

means for varying the maximum communication distance with a reader as a function of the application selected or activated from among the several different applications, wherein the means for varying the maximum communication distance includes means for varying the equivalent impedance of the electronic unit, and wherein the means for varying the equivalent impedance includes means for varying the equivalent resistance of the electronic unit, wherein the electronic unit is arranged to receive in memory zones several distance codes associated respectively with the several different applications stored in the memory zones concurrently; and a power supply circuit powers the transponder in passive mode connected to the antenna and wherein is arranged a rectifier, wherein the means for varying the equivalent resistance is formed by at least one resistor arranged in series with a switch between two terminals of the power supply circuit located after the rectifier in relation to the antenna, these two terminals having different electric potentials, and by a logic circuit for controlling the maximum communication distance which controls the switch as a function of the application selected or activated, and the logic circuit for controlling the maximum communication distance is arranged to read the distance code associated with the application selected or activated and to control the switch as a function of the distance code associated with the application selected or activated.

* * * * *